# UNITED STATES PATENT OFFICE.

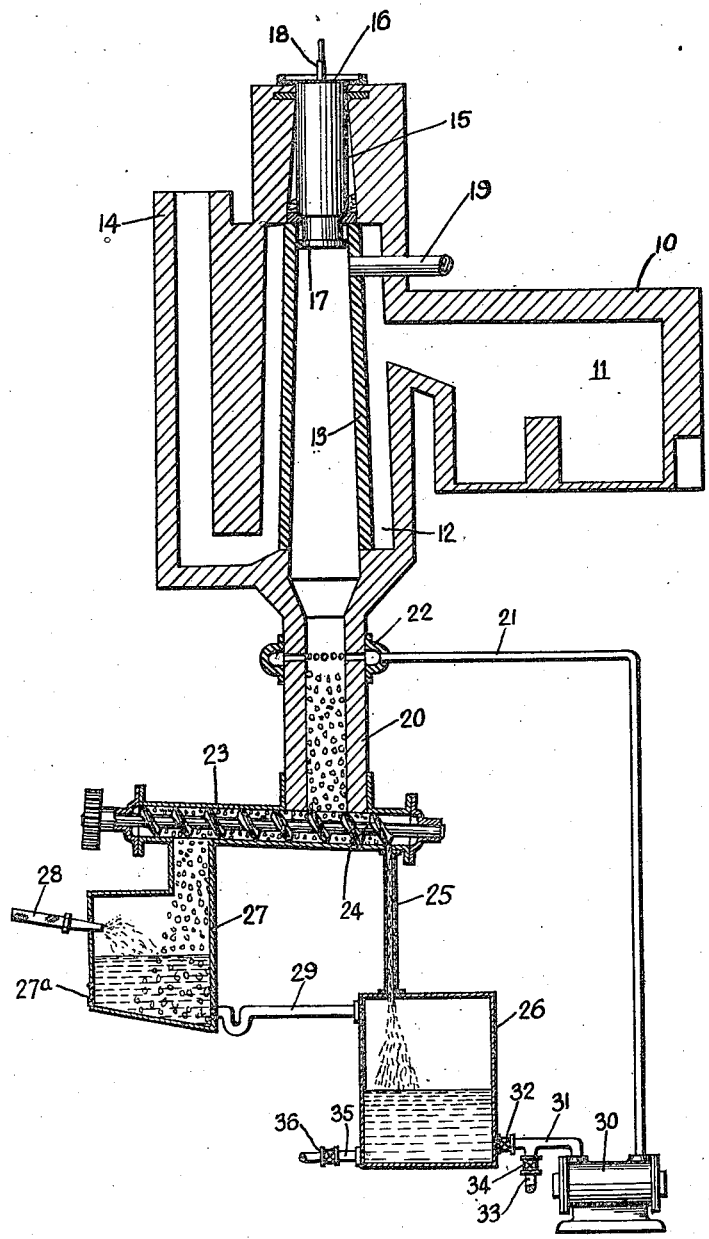

FRANK W. HALL, OF PORT ARTHUR, TEXAS, ASSIGNOR TO THE TEXAS COMPANY, OF NEW YORK, N. Y., A CORPORATION OF TEXAS.

MANUFACTURE OF TREATING MATERIALS CONTAINING ALUMINUM CHLORIDE.

Application filed December 27, 1921. Serial No. 524,886.

*To all whom it may concern:*

Be it known that I, FRANK W. HALL, a citizen of the United States of America, and a resident of Port Arthur, county of Jefferson, and State of Texas, have invented certain new and useful Improvements in the Manufacture of Treating Materials Containing Aluminum Chloride, of which the following is a specification, reference being had to the accompanying drawing forming a part thereof.

This invention relates to the preparation of materials adapted for the treatment of hydrocarbon oils and relates particularly to the production of an aluminum chloride material suitable for the catalytic treatment of petroleum oils.

Aluminum chloride is commonly said to have a catalytic action on hydrocarbon oils although the exact nature of the reaction is not fully understood. Whatever may be the nature of the reaction, it is a fact that aluminum chloride may be used in treating oils at comparatively low temperatures for the improvement of the color and other qualities of the oil and at higher temperatures for the decomposition of higher boiling hydrocarbons into lower boiling ones. The aluminum chloride thus employed in the treatment of hydrocarbon oils may be introduced into the treating vessel in combination or in admixture with other hydrocarbon oils and this invention has for a primary object the preparation of such an aluminum chloride oil compound in an effective and commercial manner.

In accordance with the present invention when suitable materials are treated under such conditions as to produce aluminum chloride vapors, the ash or other materials of the reaction, including the resultant aluminum chloride vapors, are continuously removed from the reaction chamber and subjected to a bath or spray of hydrocarbon oil, whereby the aluminum chloride is separated out from the other materials of the reaction and a compound, solution or mixture of aluminum chloride and oil adapted for the treatment of hydrocarbon oils, is produced.

In carrying out my invention, I prefer to produce the aluminum chloride vapors by employing the well known reaction obtaining between alumina, carbon and chlorin, but it is to be understood that the practice of my invention is not limited to the particular method of operation set forth and that the aluminum chloride vapors may be generated in any suitable manner.

In the single figure of the accompanying drawings which illustrates a preferred form of apparatus adapted for carrying out the invention, 10 represents a furnace having a combustion chamber 11 arranged to deliver hot gases into a heating chamber 12, within which is disposed a retort 13 of suitable refractory material. The gases finally escape through a flue 14.

The retort is equipped with a suitable charging mechanism, which may be of the continuous type if desired. In the apparatus shown, the hopper 15 is so arranged that it may receive heat from the furnace so that the materials contained therein may be preheated. The hopper is provided with a charging door 16 and an outlet valve or gate 17, which is controlled by valve rod 18 and by which the materials in the hopper are discharged into the retort. The retort is equipped with a pipe 19 adapted for admitting chlorin or other gas required in the reaction.

The retort extends downwardly to provide an outlet conduit 20 into which all the products of the reaction including the ash or other spent material and the aluminum chloride vapors are discharged. A pipe 21 which may communicate with any suitable source of hydrocarbon oil terminates in a spray pipe 22 by which oil is discharged into the conduit 20 and in contact with the materials being discharged from the converter.

The conduit 20 terminates in an ash discharge conduit 23 which is provided with a conveyor 24 or other equivalent means for continuously transferring the solid materials. The chamber 23 is preferably inclined upwardly in the direction of the travel of the solid materials, so that the liquid draining from the solid matter may be discharged at the lower end of the conduit through a pipe 25 into a tank 26, while the solid material is carried by the conveyor to the upper end and is discharged into a tank or receptacle 27 having a manhead or door 27ª for the removal of the solid materials. A spray pipe 28 is arranged to discharge oil onto the material in the receptacle 26, so that any aluminum chloride yet present may be removed from the material and discharged into a pipe 29 which terminates in the tank 26.

A pump 30 is arranged to force oil from any suitable source or in cycle from the tank 26 through the pipe 21 to the spray nozzle 22. The pump inlet pipe 31 which communicates with the tank 26 has a control valve 32 and a branch line 33 having a valve 34 which is connected to a source of fresh oil. A pipe 35 having a valve 36 is provided for drawing off the contents of the tank 26, as may be required.

In carrying out the invention by means of the apparatus shown and using the reaction obtaining between alumina, carbon, and chlorin; a coked mixture of alumina and chlorin is introduced into the hopper 15 and is discharged into the retort either continuously or from time to time as may be required. Chlorin gas is introduced through the pipe 19 and by means of the heat from the furnace 10 the retort is maintained at a temperature sufficient for the reaction.

The products of the reaction including ash and aluminum chloride vapors pass out of the retort into the conduit 20 where they come in contact with a stream of oil issuing from the spray nozzle 27. The oil takes up the aluminum chloride thus separating it from the solid materials. A liquid product is formed in which aluminum chloride is present. The exact nature of this product is not known, but aluminum chloride is present in the hydrocarbon liquid either in suspension or in solution in the liquid, or in chemical combination with some of the hydrocarbon compounds. The liquid oil removes the aluminum chloride from the ash and the resultant aluminum chloride-containing liquid is discharged into the tank 27.

The ash is removed into the receptacle 26 wherein it may be subjected to a bath or spray of oil to remove any traces of aluminum chloride not removed from the ash in the original treatment. The ash may be removed from the receptacle and centrifuged, if desired, to separate out any liquid contained therein. The liquid collected in the receptacle 27 is preferably allowed to drain into the receiver 26, as through the conduit 29.

On beginning the operation, the pump 30 may be employed to draw the oil from a suitable source and supply it to the spray nozzle. After the operation has been in progress for a time, liquid will have been collected in the tank 26, and the valve 34 may then be closed, the valve 32 opened and the aluminum chloride containing liquid withdrawn from the receptacle 26 and pumped through the line 21 and the spray nozzle 22 into the conduit 20. In this manner, the liquid may be circulated until an oil, having a sufficient concentration of aluminum chloride, is collected in the tank 26. This liquid may be drawn off and used in the treatment of hydrocarbon oils as desired.

An oil, which is to be treated with aluminum chloride may be introduced through the pipe 21 and its flow so regulated that it may be contacted with aluminum chloride vapors in the conduit 20 in such manner as to treat the oil as may be desired, the treated oil being withdrawn from the tank 26.

Obviously many modifications and variations of the invention, as hereinbefore set forth, may be made without departing from the spirit and scope of the invention, and therefore, only such limitations should be imposed as are indicated in the appended claims.

What is claimed is:

1. The process of making treating materials which comprises chlorinating an aluminous material under conditions to form aluminum chloride, withdrawing the resultant ash and chloride vapors, bringing said ash and vapors in contact with hydrocarbon oil and separating the resultant liquid containing aluminum chloride from the ash.

2. The process of making treating materails which comprises introducing alumina and a reducing agent into a retort, admitting a chlorinating agent into said retort, heating the retort sufficiently for chemical reaction, withdrawing the resultant ash and aluminum chloride vapors, washing the materials so withdrawn with a hydrocarbon oil and separating the ash from the liquid containing aluminum chloride.

3. The process of making treating materials which comprises contacting alumina and carbon with chlorin under temperatures sufficient for chemical reaction, removing the resultant ash and aluminum chloride vapor from the bottom of the retort, contacting the materials so removed with hydrocarbon oil, and continuously separating the ash from the aluminum chloride-containing liquid.

4. The process of making treating materials which comprises contacting alumina and carbon with chlorin under temperatures sufficient for chemical reaction, removing the resultant ash and aluminum chloride vapors from the bottom of the retort, spraying hydrocarbon oil on the materials so removed, and separating the ash from the aluminum chloride containing liquid.

5. The process of making treating materials which comprises reacting materials under conditions to form aluminum chloride vapors and contacting the products of the reaction with hydrocarbon oil whereby the vapors are absorbed in said oil.

6. The process of making treating materials which comprises reacting materials under conditions to form aluminum chloride vapors, contacting the products of the reaction with hydrocarbon oil whereby the vapors are absorbed in the oil and separating the resultant aluminum chloride containing liquid from other products of the reaction.

7. The process of making a treating material which comprises reacting materials under conditions to form aluminum chloride vapors, contacting the products of the reaction with hydrocarbon oil whereby the vapors are absorbed in the oil and separating the resultant aluminum chloride-containing liquid from the solid bodies of said reaction.

8. The process of making treating materials which comprises reacting materials under conditions to form aluminum chloride vapors, and solid bodies, contacting the products of the reaction with hydrocarbon oil whereby the vapors are absorbed in the oil and continuously discharging the solid bodies while permitting the resultant liquid containing aluminum chloride to separate therefrom.

9. The process of making treating materials which comprises reacting materials under conditions to form aluminum chloride vapors and solid bodies, contacting the products of the reaction with hydrocarbon oil whereby the vapors are absorbed in the oil, continuously discharging the solid bodies while permitting the resultant liquid containing aluminum chloride to separate therefrom and continuously bringing said liquid into contact with the generated aluminum chloride vapors and solid bodies.

10. The process of making treating materials which comprises treating materials in a retort to form aluminum chloride vapors and solid bodies, allowing said vapors and solid bodies to descend from the retort bringing a stream of hydrocarbon oil into contact with said vapors and solid bodies, continuously removing the solid bodies while permitting the resultant liquid containing aluminum chloride to be separated therefrom.

11. The process of making treating materials which comprises treating materials in a retort to form aluminum chloride vapors and solid bodies, allowing said vapors and solid bodies to descend from the retort, bringing hydrocarbon oil into contact with said vapors and solid bodies, continuously removing the solid bodies up an incline while permitting the resultant liquid containing aluminum chloride to be drained therefrom.

12. The process of making treating materials which comprises treating materials in a retort to form aluminum chloride vapors and solid bodies, allowing said vapors and solid bodies to descend from the retort, bringing hydrocarbon oil into contact with said vapors and solid bodies, continuously removing the solid bodies up an incline while permitting the resultant liquid containing aluminum chloride to be drained therefrom, collecting said liquid in a receptacle, collecting the solid bodies in another receptacle, washing with hydrocarbon oil the solid bodies so collected and draining off the resultant liquid.

13. The process of making treating materials which comprises treating materials in a retort under conditions to form aluminum chloride vapors and solid bodies, removing said vapors and solid bodies from the retort, continuously circulating a stream of hydrocarbon oil from a source of supply and bringing said stream of oil in contact with the vapors and solid bodies removed from the retort, separating the resultant aluminum chloride-containing liquid from said solid bodies and returning said liquid to said source of supply.

14. In apparatus for preparing treating materials, a retort, means for admitting thereto materials adapted to be used in the production of aluminum chloride vapors, a passage from the retort adapted for the removal of vapors and solid bodies, means for admitting oil into said passage, and means for separating liquid from solid materials discharged from said passage.

15. In apparatus for preparing treating materials, a retort, means for admitting thereto materials adapted to be used in the production of aluminum chloride vapors, a passage from the retort adapted for the removal of vapors and solid bodies, means for admitting oil into said passage, a separating chamber into which said passage discharges, a conveyor in said chamber adapted to remove solid material therefrom, and means for removing liquid from said chamber.

16. In apparatus for preparing treating materials, a retort, means for admitting thereto materials adapted to be used in the production of aluminum chloride vapors, a passage from the retort adapted for the removal of vapors and solid bodies, means for admitting oil into said passage; an inclined receptacle into which said passage discharges, a conveyor therein adapted for conveying solid bodies up the incline and means for draining liquid from said chamber.

17. In apparatus for preparing treating materials, a retort, means for admitting thereto materials adapted to be used in the production of aluminum chloride vapors, a passage from the retort adapted for the removal of vapors and solid bodies, means for admitting oil into said passage, a separating chamber into which said passage discharges, a conveyor in said chamber adapted to remove solid material therefrom, means for removing liquid from said chamber and separate receptacles for collecting the liquid and solid bodies discharged from the separating chamber.

18. In apparatus for preparing treating materials, a retort, means for admitting thereto materials adapted to be used in the production of aluminum chloride vapors, a passage from the retort adapted for the removal of vapors and solid bodies, a supply tank, means for drawing oil from said supply tank and bringing it in contact with the materials in the passage from the retort, means for separating liquid from solid materials discharged from said passage, and means for returning the liquid so separated to the supply tank.

19. The process of treating oils that consists in contacting the oil with solid and fluid reaction materials from an aluminum chloride process.

20. The process of making an aluminum chloride oil mixture that consists in washing the various gaseous and solid products of an aluminum chloride reaction with oil.

21. The process of making treating materials that consists in contacting with oil, vapors and solid products formed in the chloridizing of aluminous material.

22. The process of preparing a reactive agent adapted for treating hydrocarbon oils that comprises contacting with hydrocarbon oil, vapors and solid products formed by chloridizing aluminous material.

23. The process of making treating materails which comprises reacting aluminum-bearing materials with a chlorinating agent to form aluminum chloride, contacting the solid and fluid products of the reaction with oil to remove the bulk of the aluminum chloride, discharging the ash and spent materials and washing them with oil to recover the remaining aluminum chloride.

24. The process of making treating materials which comprises reacting aluminum-bearing materials with a chlorinating agent to form aluminum chloride, removing from the reaction products the bulk of the aluminum chloride, and washing the ash and spent materials with oil to recover and collect the remaining aluminum chloride.

In witness whereof I have hereunto set my hand this 8th day of December, 1921.

FRANK W. HALL.